US012569089B2

(12) United States Patent
Brachmann et al.

(10) Patent No.: US 12,569,089 B2
(45) Date of Patent: Mar. 10, 2026

(54) DINING TABLE FOR HEATING A FOOD PORTION

(71) Applicant: Gabriele Brachmann, Unterhaching (DE)

(72) Inventors: Gabriele Brachmann, Unterhaching (DE); Reto Kathriner, Giswil (CH)

( * ) Notice: Subject to any disclaimer, the term of this patent is extended or adjusted under 35 U.S.C. 154(b) by 727 days.

(21) Appl. No.: 18/056,521

(22) Filed: Nov. 17, 2022

(65) Prior Publication Data

US 2023/0255402 A1 Aug. 17, 2023

(30) Foreign Application Priority Data

Feb. 15, 2022 (EP) ..................................... 22156780

(51) Int. Cl.
*A47J 37/07* (2006.01)
*A47J 37/06* (2006.01)

(52) U.S. Cl.
CPC ....... *A47J 37/0781* (2013.01); *A47J 37/0605* (2013.01); *A47J 2037/0795* (2013.01)

(58) Field of Classification Search
CPC ................ A47J 37/0605; A47J 37/0676; A47J 37/0777; A47J 37/0781; A47J 37/0786; A47J 37/0795; A47J 2037/0777; A47J 2037/0795
See application file for complete search history.

(56) References Cited

U.S. PATENT DOCUMENTS

| | | | |
|---|---|---|---|
| 2008/0110870 A1 | 5/2008 | Mirkes et al. | |
| 2013/0200064 A1* | 8/2013 | Alexander | .......... A47J 36/2483 |
| | | | 219/441 |
| 2021/0177204 A1 | 6/2021 | True et al. | |

FOREIGN PATENT DOCUMENTS

| | | |
|---|---|---|
| CN | 203776394 U | 8/2014 |
| CN | 105996812 A | 10/2016 |
| CN | 211065564 U | 7/2020 |
| DE | 29501967 U1 | 3/1995 |
| DE | 29601691 U1 | 3/1996 |
| DE | 19850939 A1 | 5/2000 |
| DE | 202007016724 U1 | 2/2008 |
| DE | 102017220645 A1 | 5/2019 |
| EP | 1396219 A1 | 3/2004 |
| EP | 1607031 A1 | 12/2005 |
| EP | 2208436 A2 | 7/2010 |
| EP | 2389835 A1 | 11/2011 |
| GB | 2140678 A | 12/1984 |
| KR | 200341148 Y1 | 2/2004 |
| KR | 20080029049 A | 4/2008 |

(Continued)

OTHER PUBLICATIONS

Office Action in corresponding European application serial No. 22156780.3 dated Jul. 31, 2025.

(Continued)

*Primary Examiner* — Hung D Nguyen

(74) *Attorney, Agent, or Firm* — Westman, Champlin & Kochler, P.A.

(57) ABSTRACT

The present application relates to a dining table for heating a food portion, in particular a raclette table. The dining table comprises a support frame, a tabletop supported on the support frame, and an extendable section, wherein the extendable section is received in a recess of the tabletop and comprises a pocket-shaped opening with one or more heating elements for heating a food portion.

20 Claims, 6 Drawing Sheets

(56)  References Cited

FOREIGN PATENT DOCUMENTS

| KR | 1020110106578 | A  | 9/2011 |
|----|---------------|----|--------|
| KR | 20120003315   | U  | 5/2012 |
| KR | 20130071608   | A  | 7/2013 |
| KR | 101493235     | B1 | 2/2015 |
| KR | 20160017496   | A  | 2/2016 |
| KR | 20180043949   | A1 | 5/2018 |
| WO | 2018065742    | A1 | 4/2018 |

OTHER PUBLICATIONS

European Search Report in corresponding European Patent Application No. 22156780.3 dated Aug. 5, 2022.

* cited by examiner

1

DINING TABLE FOR HEATING A FOOD PORTION

CROSS-REFERENCE TO RELATED APPLICATION

The present application claims priority from European Patent Appl. No. 22 156 780.3, filed Feb. 15, 2022, which is hereby incorporated by reference in its entirety.

FIELD

The present application relates to a dining table for heating a food portion, in particular a raclette table.

BACKGROUND

Various tables with built-in cooking devices are known from the prior art.

Published German patent application DE 198 50 939 A1 discloses a dining table with a central cooking device. A gas burner is arranged in a central area of the table to heat a cooking pot on a cooking surface provided therefor.

CN 203776394 U relates to a dining table with a separate height-adjustable hot plate used for keeping warm the containers above the plate.

Furthermore, WO 2018/065742 A1 describes an integrated raclette table.

Various raclette devices are also known from the prior art, such as EP 1 396 219 A1 and EP 1 607 031 A1.

However, especially for the preparation of warm raclette dishes, there has not yet been a satisfactory solution that would successfully integrate the function of a raclette device into a dining table in a space-saving, ergonomic and operationally safe manner Problems arise especially in the gastronomy and hotel business, where the assembly and disassembly of raclette devices on tables means a considerable effort. The catering for larger groups, for which a large number of raclette devices usually has to be set up, is particularly time-consuming.

Embodiments of the present invention provide a dining table which, in particular, takes into account the disadvantages of the prior art and which is easy to operate and safe.

SUMMARY

According to a first aspect, a dining table is provided having a support frame, a tabletop and an extendable section. The tabletop is supported on the support frame and includes a recess. The extendable section is received in the recess of the tabletop and comprises a pocket-shaped opening with one or more heating elements for heating a food portion, optionally multiple food portions. The extendable section is movable in the vertical direction of the dining table between a lowered position, in which the pocket-shaped opening is sunk in the recess, and a raised position, in which the pocket-shaped opening protrudes from the tabletop.

Optionally, the food portion is a raclette section and is optionally prepared in a raclette pan or scoop. Optionally, at least 5, at least 8 or at least 10 raclette scoops can be received and heated simultaneously in the pocket-shaped opening. Optionally, therefore, the extendable section serves for melting slices of cheese, rather than, for example, whole halves of cheese. However, the use of the table is not exclusively limited to raclette preparation. It can also be used for other purposes, such as reheating, grilling, cooking or baking a section of food.

The movement of the extendable section in the vertical direction allows the table to be used in the lowered position for everyday use as a dining table and in the raised position for use of the pocket-shaped opening with heating elements for heating the food portion. This saves the user a time-consuming assembly and disassembly, especially if the pocket-shaped opening and/or the integrated cooking device is used frequently. The built-in solution also has the advantage that no additional storage space is needed for the cooking device and the connecting cables. With the customized design it is also possible to make the dining table to be aesthetically pleasing and functional.

The pocket-shaped opening may have a base for depositing at least one container with a portion of food, optionally for depositing a plurality of containers with a respective portion of food portion. In this regard, in the raised position, the base of the pocket-shaped opening may be arranged at the same level as or above the tabletop, optionally at least 0.5 cm or at least 1 cm above the tabletop. In the raised position, the base may lie above the tabletop so as to prevent that the containers accidentally rest against the tabletop and that the elevated temperature of the containers in the area of contact with the tabletop causes undesirable burn marks.

Alternatively, or additionally, in the lowered position, the extendable section may protrude less than 5 cm above the tabletop, optionally less than 2 cm. Optionally, it does not protrude above the tabletop. In the lowered position of the extendable section, the height difference can be made relatively small for everyday use of the dining table.

The containers may be small pans (especially raclette pans or coupelles) or small pots. The containers may be open at the top.

Further, the pocket-shaped opening may have an inner side wall and/or a ceiling. Optionally, the pocket-shaped opening is open to the side and/or towards the tabletop. Due to the ceiling, a greater part of the heat initially remains inside the pocket-shaped opening. The ceiling may also allow radiant heat from heating elements disposed below the ceiling to be directed to the food portion(s). The ceiling may also reduce the risk of grease or oil splashing towards the user when cooking the food portion.

The inner side wall may form a supporting structure of the pocket-shaped opening. The inner side wall can connect the base with the ceiling.

The pocket-shaped opening can be formed circumferentially around the extendable section. This allows the table to be used flexibly by user groups of different sizes. It also facilitates cleaning. Furthermore, this makes it easier for users to place the food portion into the opening. In particular, a plurality of containers may be inserted into the pocket-shaped opening from each side of the dining table.

The extendable section may further have a lower side wall extending downward from the pocket-shaped opening (e.g., from its base). This avoids a gap between the opening and the tabletop, into which a finger could be inserted, for example. The safety for the user is thus increased.

The pocket-shaped opening may be supported on the table frame via the lower side wall. The lower sidewall may form a supporting structure of the pocket-shaped opening.

The pocket-shaped opening and/or the extendable section may be made of metal, optionally steel, for example stainless steel.

The material of the pocket-shaped opening may be thermally conductive.

The pocket-shaped opening, particularly its base, may be coated with a non-adhesive material, such as polytetrafluoroethylene. This may facilitate cleaning in the event of spillage of food portions.

Optionally, the one or more heating elements are heating loops. A heating element may extend at least partially or completely along the pocket-shaped opening around the extendable section.

Alternatively, or additionally, along the pocket-shaped opening, a plurality of heating elements may be arranged around the extendable section. The dining table may comprise at least eight, at least ten, or at least twelve heating elements (e.g., heating loops).

The plurality of heating elements may be spaced apart from each other. The heating elements may each be allocated to a seat.

Further, the dining table may be provided with a regulator and/or a control device for adjusting the heat output and/or the temperature of the one or more heating elements. The heat output and/or temperature of the plurality of heating elements may be adjustable individually or in subgroups, for example by a respective user. The dining table may comprise a plurality of regulators which allow a user to adjust the temperature and/or the heat output for an individual heating element or for a subgroup of the heating elements.

By allowing the heat output and/or the temperature to be regulated by a respective user at the seat, the cooking preparation may proceed in an individualized and controlled manner. However, it is often sufficient if the regulation is carried out centrally by one user. If the dining table is not used by the full number of users, the heating elements may be turned on individually or in subgroups.

Optionally, the heating elements are arranged along a straight section of the pocket-shaped opening at a minimum distance from each other of 20 cm or 40 cm. Alternatively, or additionally, the heating elements may be more closely arranged along a curved section or corner section of the pocket-shaped opening than along the straight section.

The one or more heating elements may be arranged below and/or along the ceiling.

The one or more heating elements may be disposed at a distance from the base, the distance optionally being at least 3 cm or at least 5 cm. The one or more heating elements may be configured such as to heat the food portion from above. Optionally, the one or more heating elements are configured such that the one or more containers deposited on the base may be arranged below the heating elements. This arrangement is particularly convenient for the preparation of raclette, because the cheese is melted from above.

Further, the extendable section may include a depositing surface. Optionally, the depositing surface is arranged above the base, adjacent a top surface of the ceiling, and/or substantially on the same level with the top surface of the ceiling. The depositing surface may rest on the extendable section and/or be detachable. Optionally, the extendable section includes a central recess and/or a supporting surface for receiving the depositing surface.

The depositing surface may be used as a shared use area in the center of the dining table where objects may be deposited and accessed in an easily accessible manner.

The depositing surface may be detachable from the extendable section (in particular without requiring tools). This facilitates cleaning of the depositing surface.

Optionally, the depositing surface rests on the extendable section by gravity only.

Optionally, the depositing surface is made of a material having a lower thermal conductivity than the pocket-shaped opening and/or of marble and/or stone. This prevents objects on the depositing surface from warming unintentionally.

The depositing surface may be integrally made or formed from a plurality of segments. The pocket-shaped opening may surround the depositing surface at least in sections or completely. The division into several segments has the advantage that the depositing surface is cheaper to manufacture and easier to detach.

The extendable section may comprise a hot plate. Optionally, the hot plate is arranged above the base of the pocket-shaped opening. The hot plate may form the afore-mentioned ceiling of the pocket-shaped opening. In this way, the heat from the heating elements below the ceiling and/or the hot plate can be used at the same time for heating the hot plate. The hot plate may offer an additional option for cooking preparation, such as fondue.

The hot plate may rest on the extendable section and/or be detachable therefrom (optionally without requiring tools). For cleaning, the hot plate may optionally be taken off from the extendable section.

Optionally, the hot plate rests on the extendable section by gravity only. This reduces the risk of crushing when the extendable section is lowered. Thus, the hot plate is raised if an object or finger should be in the pocket-shaped opening.

The extendable section may have a central recess and/or a supporting surface for receiving the hot plate. Optionally, the inner side wall of the pocket-shaped opening is configured to receive the hot plate. The inner side wall may surround the hot plate at least partially or completely.

The hot plate may be made of a material having a higher thermal conductivity than the supporting surface and/or of steel (e.g., stainless steel).

The hot plate may be coated with a non-adhesive material, such as polytetrafluoroethylene. In the event of spillage of food portions, this can facilitate cleaning.

The hot plate may be formed integrally or from several segments. A multi-segment design facilitates detachment for cleaning or in the event of an object being crushed.

The hot plate may form a heating surface for depositing at least one container with a food portion, optionally for depositing a plurality of containers with a respective portion of food. Optionally, the heating surface is disposed substantially flush with or below the depositing surface. The heating surface may be arranged at least 0.3 cm, at least 0.5 cm or at least 1 cm below the depositing surface. The heating surface may be surrounded by a radially inner raised edge and/or a radially outer raised edge. Optionally, the inner and/or outer raised edge is/are formed by the hot plate (in particular, being integrally formed therewith). Because of the edge, spilled liquid can be collected.

The dining table may further comprise a cover for the hot plate. Optionally, a top surface of the cover is substantially flush with the depositing surface. When the hot plate is not in use and has cooled down, it may be concealed by the cover. The flush surface prevents an elevation relative to the dining tabletop when the extendable section is in the lowered position.

The cover may be formed of several segments.

The cover may have a central opening and/or surround the depositing surface. In particular, the cover may be configured such that the depositing surface remains accessible even when the cover rests on the hot plate.

In operation, the heating elements may be supplied by one or more cables from a power source, for example with a voltage in a range of from 100 to 240 volts or of at least 400 volts (e.g., heavy current). A heavy current supply may accommodate the required energy consumption, especially if the table is designed for 8 or more persons.

The dining table may include a control device for controlling the heating elements and/or for controlling one or more movement members.

In operation, the heating elements may be controlled by one or more cables from a regulator and/or the control device. The control device may be configured such that the one or more heating elements cannot be turned on in the lowered position and/or such that the one or more heating elements can only be turned on in the raised position. This ensures that the heating elements are only turned on under safe circumstances, for example in the raised position.

The cables for the power supply are optionally concealed. In particular, the cables may extend in one or more channels underneath the tabletop. The one or more channels are optionally milled into the tabletop, at least in sections. The channels may be covered with a slat from below.

The control device may be configured to prevent movement of the extendable section from the raised position to the lowered position if the one or more heating elements are turned on. Alternatively, or additionally, the control device may be configured to prevent movement of the extendable section from the raised position to the lowered position before the one or more heating elements have been turned off for a predetermined minimum cooling time, the minimum cooling time, for example, depending on the duration of a previous operation of the heating element(s). Optionally, the control device does not prevent movement from the raised position to the lowered position if, prior to turning off, the heating elements have only been turned on for a short time, for example for less than 30 seconds. This prevents damage to the table.

Alternatively, or additionally, the dining table may include one or more temperature sensors, with the control device being configured to prevent movement of the extendable section from the raised position to the lowered position before the one or more temperature sensors determine that the temperature of the hot plate, the pocket-shaped opening, and/or the one or more heating elements is below a predetermined maximum temperature. This, too, may prevent damage to the table. The use of the temperature sensors may replace and/or supplement the regulation of temperatures by time.

In the raised position, a control device may automatically turn off the one or more heating elements after activation and a predetermined eating time, optionally of more than 4 hours. This can reduce the risk of accidents in the event of an accidental failure to turn off the table.

The above safety measures are particularly beneficial when users are allowed to use the table independently or when the table is accessible to users without supervision (e.g., when it is placed in accommodation to be rented, such as a chalet).

The heating elements along a curved section or a corner section of the pocket-shaped opening may be intermittently turned on and off. Optionally, these heating elements, after a predetermined on-time, may repeatedly be turned off automatically for a predetermined pause time, and then turned on again. The on-time may be at least 1 minute or at least 2 minutes. The pause time may be at least 10 seconds or at least 20 seconds.

In order for the cooking preparation to be similar for all users of the dining table, it is desirable that the heating elements have an even temperature distribution. Since the heating elements are closer together in a curved or a corner section than in a straight section, the food portions can be prepared more quickly there. The intermittent turning on and off the heating elements in a curved or a corner section extends the preparation time so that users can enjoy the meal at the same pace.

The control device may be arranged in a fire protection housing. Optionally, the housing is made of gypsum fiber. The control device may be arranged below the depositing surface in the extendable section, optionally on one or more crossbeams of the extendable section. The extendable section may be covered from below by a cover, for example made from aluminum. This increases safety, for example in the event of accidental short circuits. The cover below the extendable section can prevent access from below, e.g., by children.

The support frame may comprise at least two extendable columns, the upper end of the columns being configured to receive the extendable section. The extendable columns may comprise a fixed section and a movable section, the upper end optionally being formed by the movable section.

Furthermore, the support frame may comprise at least two support columns, the upper end of the support columns being configured to receive the tabletop. The support columns may be connected with the extendable columns, for example with the fixed section thereof. The extendable columns may each comprise a movement member, optionally an electric or hydraulic lifting cylinder. The extendable columns may each comprise a section for receiving the movement member.

The extendable columns may provide an end stop for the extendable section in the lowered position, optionally for the crossbeam of the extendable section. The end stop may be formed by an end stop section for receiving the extendable section and/or the crossbeam in the fixed section. Optionally, the end stop section determines the end position of the extendable section in the lowered position.

The tabletop may comprise an end stop section for receiving the extendable section in the raised position, optionally a crossbeam of the extendable section. In the raised position, the extendable section may abut the end stop section of the tabletop from below. The end stop section may define the end position of the extendable section.

Optionally, the extendable columns and/or the support columns comprise one or more recesses for the cables. These recesses may form cable guides.

The tabletop may have one of the following shapes: oval, circular, rectangular, hexagonal, octagonal. The extendable section, the pocket-shaped opening, the depositing surface, and the hot plate may have one of the following shapes: oval, circular, rectangular, hexagonal, octagonal.

The shape of the tabletop may be designed according to the seating plan of the users. An even distribution of persons is aimed at, where users may also sit facing each other. In particular, accessibility to the common use area, namely the depositing surface, may be made as easy as possible. For the same reason, the extendable section, the pocket-shaped opening, the depositing surface, and the heating plate may be shaped according to the desired use.

Optionally, the tabletop has one or more recesses for the cable guide, for example on the lower side of the tabletop.

The dining table and/or an ensemble including the dining table may further comprise an extractor fan and/or a bench.

The present summary is provided only by way of example and not limitation. Other aspects of the present invention will be appreciated in view of the entirety of the present disclosure, including the entire text, claims and accompanying figures.

Figure 1:
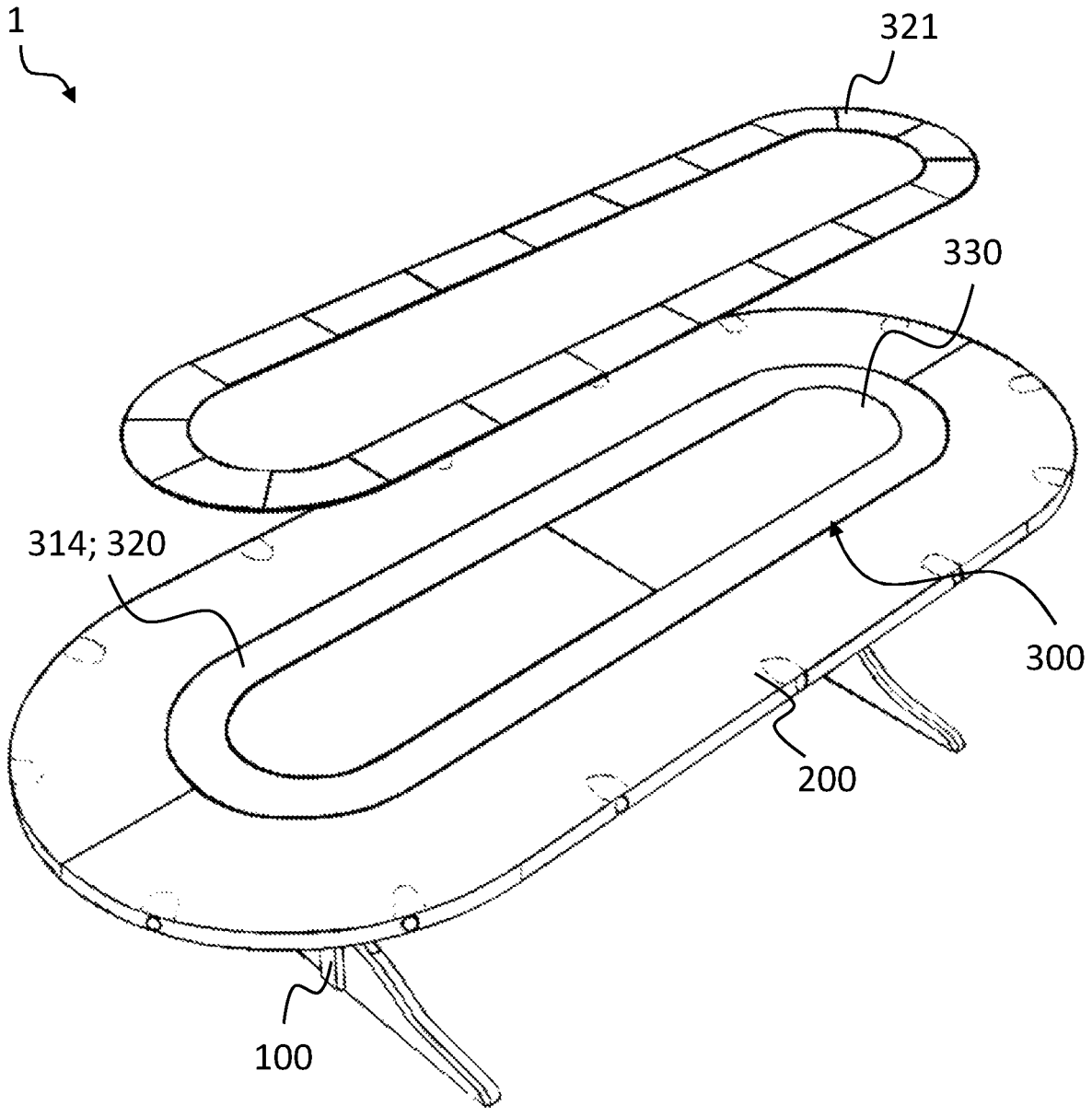
FIG. 1 a perspective view of a preferred embodiment of a dining table according to the invention in the lowered position.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

DETAILED DESCRIPTION

In the following, an embodiment for carrying out the invention will be described in more detail, where appropriate with reference to the accompanying drawings. Nevertheless, the invention is not limited to this embodiment described below. Various modifications may be made to the invention without departing from the basic idea of the invention. The scope of protection is defined solely by the claims and their equivalents.

FIGS. 1 to 6 show a particularly preferred embodiment of a dining table 1 according to the invention.

Figure 2:
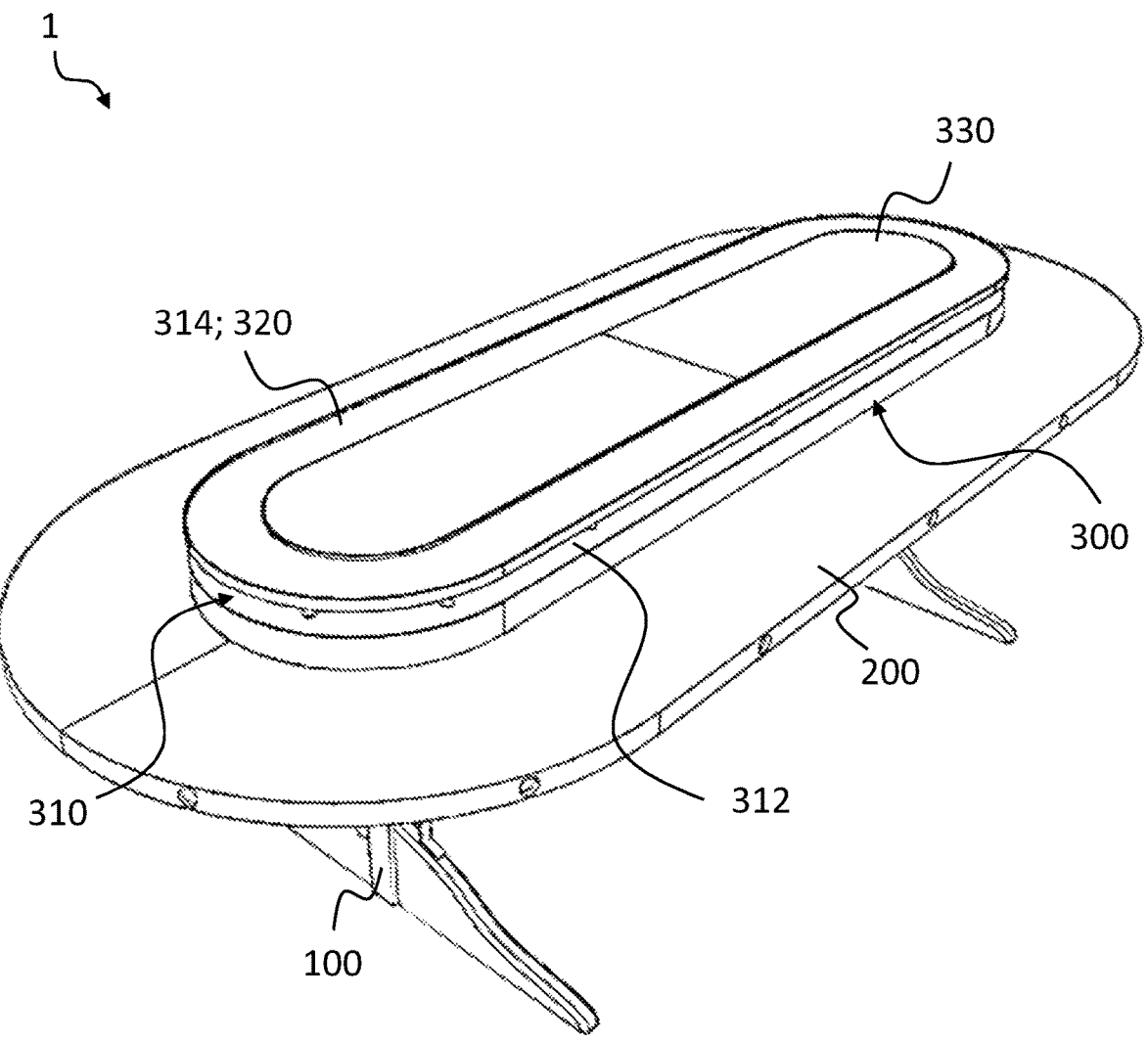
FIG. 2 a perspective view of the dining table according to FIG. 1 with the extendable section in the raised position.

FIGS. 1 and 2 show a perspective view of the dining table 1 according to the invention with a support frame 100, a tabletop 200 and an extendable section 300. The tabletop 200 is mounted on the support frame 100 and has a recess 210 (see FIG. 4) in which the extendable section 300 is received.

Figure 3:
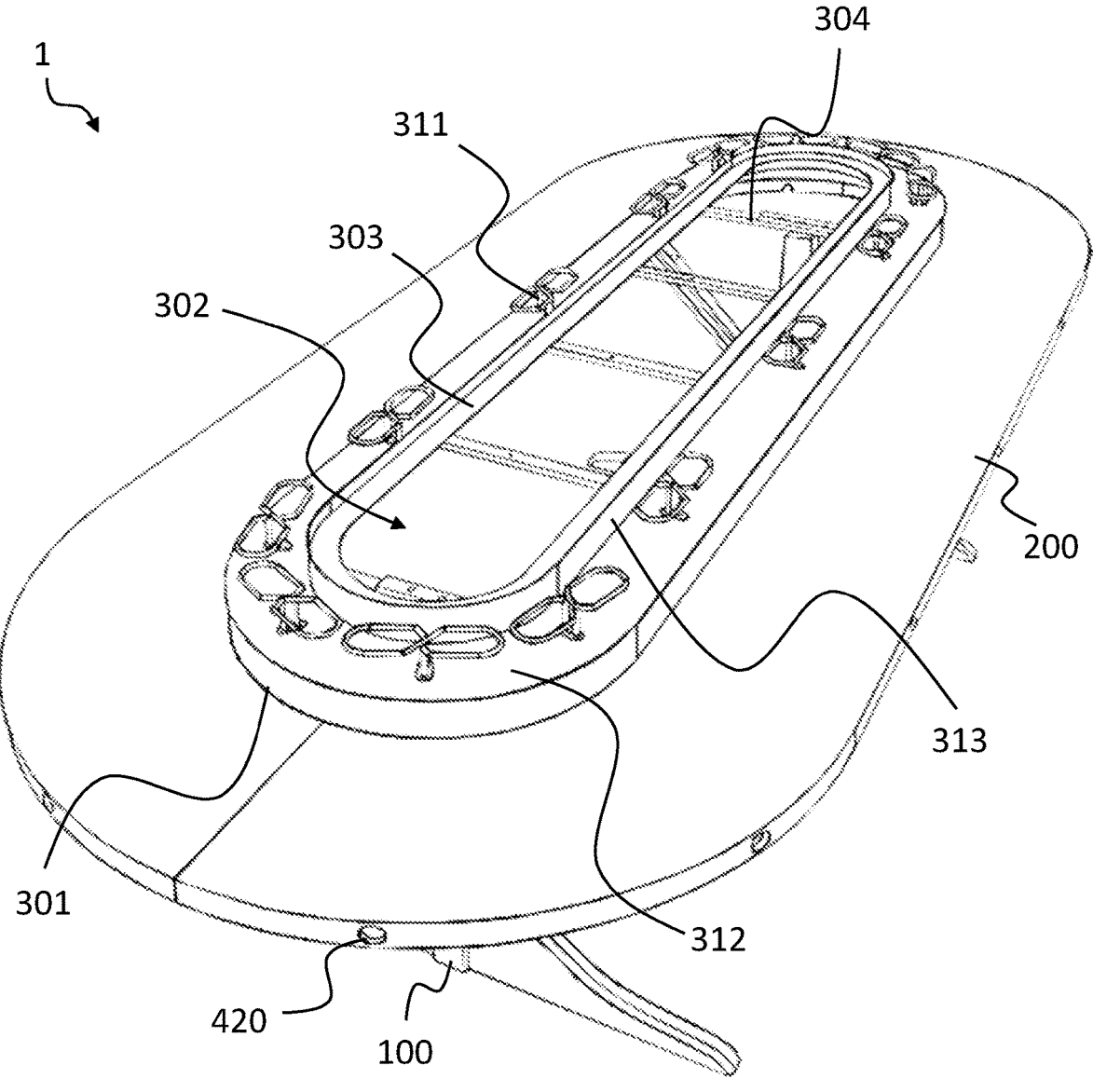
FIG. 3 a perspective view of the dining table according to FIG. 2 with a cover of a pocket-shaped opening and a depositing surface of the dining table being removed.

The extendable section 300 comprises a depositing surface 330 that is received in a central recess 302 and/or on a supporting surface 303 of the extendable section 330 (see also FIG. 3). The depositing surface 330 may be placed on and/or removed from the extendable section 300. The depositing surface 330 is optionally made of a material having a lower thermal conductivity than a pocket-shaped opening 310 described in more detail below. In the example shown, the depositing surface 330 is formed from a plurality of segments.

As can be readily seen from FIGS. 1 and 2, the extendable section 300 is configured such that the extendable section is movable in the vertical direction of the dining table 1 between a lowered position, in which the pocket-shaped opening 310 is sunk in the recess 210, and a raised position, in which the pocket-shaped opening 310 protrudes from the tabletop. In the lowered position (see FIG. 1), the extendable section 300 optionally does not protrude beyond the tabletop 200. This serves the everyday use of the dining table 1. In this mode, a cover 321 may be placed flush with the tabletop 200 on the extendable section 300 (for example, on a ceiling 314 or on a hot plate 320 of the extendable section 300). In this position, the depositing surface 330 is substantially flush with the tabletop 200.

In the raised position (see FIG. 2), a pocket-shaped opening 310 becomes accessible to the user circumferentially around the extendable section 300.

The pocket-shaped opening 310 comprises at least one and, optionally, as shown in the Figures, a plurality of heating elements 311 for heating a food portion (see FIG. 3). The pocket-shaped opening 310 comprises a base 312 for depositing at least one container with the food portion, which in the raised position is optionally disposed slightly above the tabletop 200. This prevents accidental resting of the containers on the tabletop 200.

For ease of visualization, FIG. 3 shows a perspective view of the dining table 1 according to FIG. 2, wherein the ceiling 314 of the pocket-shaped opening 310 and the depositing surface 330 of the dining table 1 are removed. The pocket-shaped opening 310 has an inner side wall 313 between the ceiling 314 (not shown) and the base 312, and a lower side wall 301 extending downward from the pocket-shaped opening 310.

The pocket-shaped opening 310 is optionally made of steel, for example of stainless steel.

A plurality of heating elements 311, such as heating loops each associated with a user, are disposed along the pocket-shaped opening 310 around the extendable section 300 (see FIG. 3). The heating elements 311 are optionally arranged along a straight section of the pocket-shaped opening 310 at a minimum distance from each other of 20 cm or 40 cm, and are arranged more closely along a curved section or a corner section of the pocket-shaped opening 310 than along the straight section.

The heating elements 311 are spaced from the base 312, for example by at least 5 cm, to heat the food portions of the containers from above.

The heating elements 311 are arranged below and/or along the ceiling 314 which serves as a hot plate, so that heat from the heating elements 311 may also be used for the preparation of additional containers with a food portion on the hot plate 320 (not shown in FIG. 3).

The heat output or the temperature of the heating elements 311 may be set via a respective regulator 420. Since the temperature in the curved section and the corner section is higher compared to that of the straight section due to the close distance between the heating elements 311, the preparation of certain food portions may be optionally slowed down or adjusted by an automatic intermittent turning on and off of the heating elements according to predetermined power-on and pause times. Optionally, the power-on time is at least 1 minute or at least 2 minutes. The pause time is optionally at least 10 seconds or at least 20 seconds.

Figure 4:
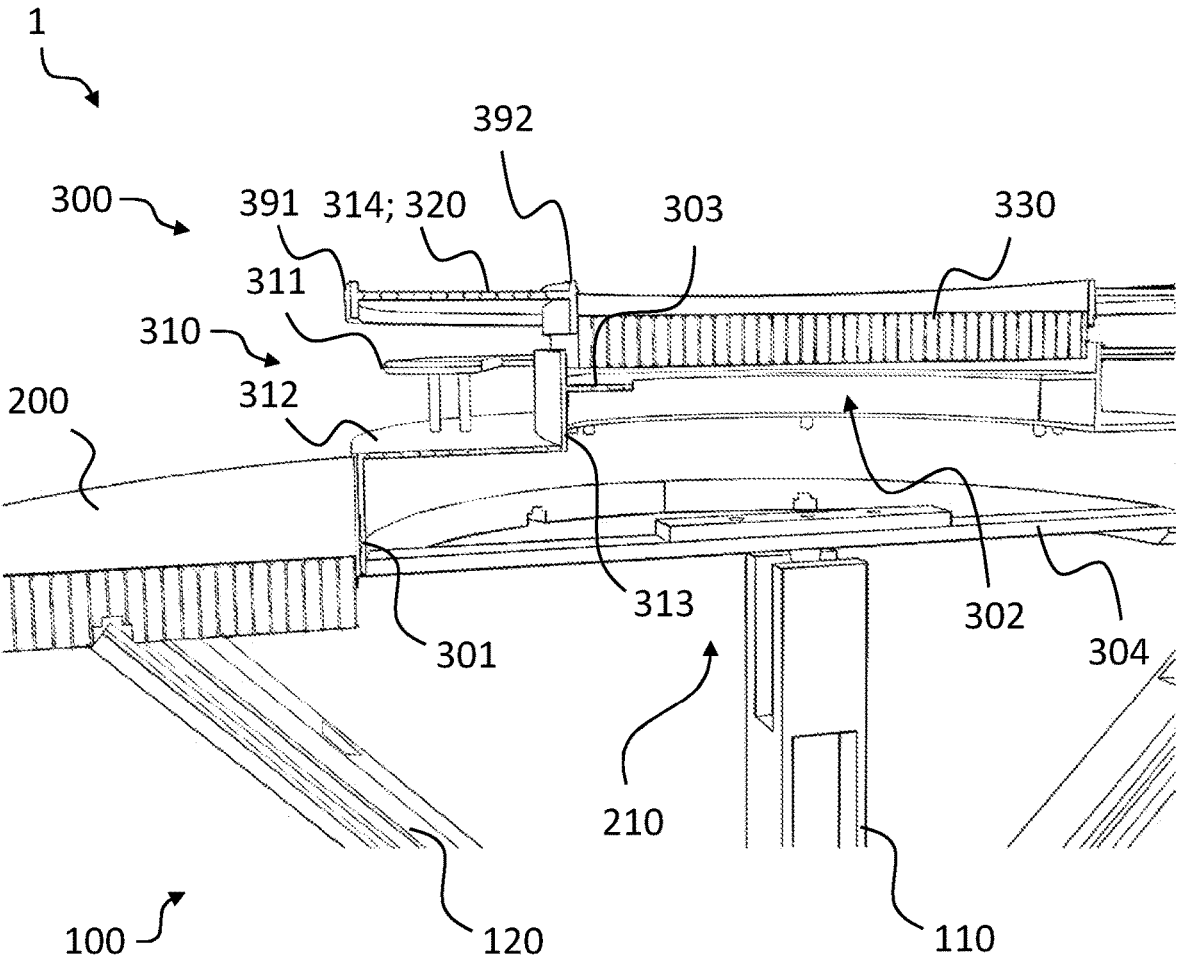
FIG. 4 a cross-sectional view of the dining table according to FIG. 2.

FIG. 4 is a cross-sectional view of the dining table 1 according to FIG. 2. The extendable section 300 is supported via a plurality of crossbeams 304.

FIG. 4 also illustrates the accommodation of the hot plate 320 and the depositing surface 330 in the central recess 302 and/or on the supporting surface 303 of the extendable section 330. The inner side wall 313 is formed circumferentially around the depositing surface 330 and the inner section of the hot plate 320. The hot plate 320 is detachable in the upward direction. This reduces the risk of crushing by the pocket-shaped opening 310 upon lowering of the extendable section 300.

The hot plate 320 has a raised inner edge 391 adjacent to the depositing surface 330 and a raised outer edge 392 adjacent to the tabletop 200. This can prevent an overflow of liquids.

Optionally, the tabletop 200, the extendable section 300, the pocket-shaped opening 310, the depositing surface 330, and the hot plate 320 have an oval shape, wherein the dining table is designed for a use by approximately 10 to 14 people.

Figure 5:
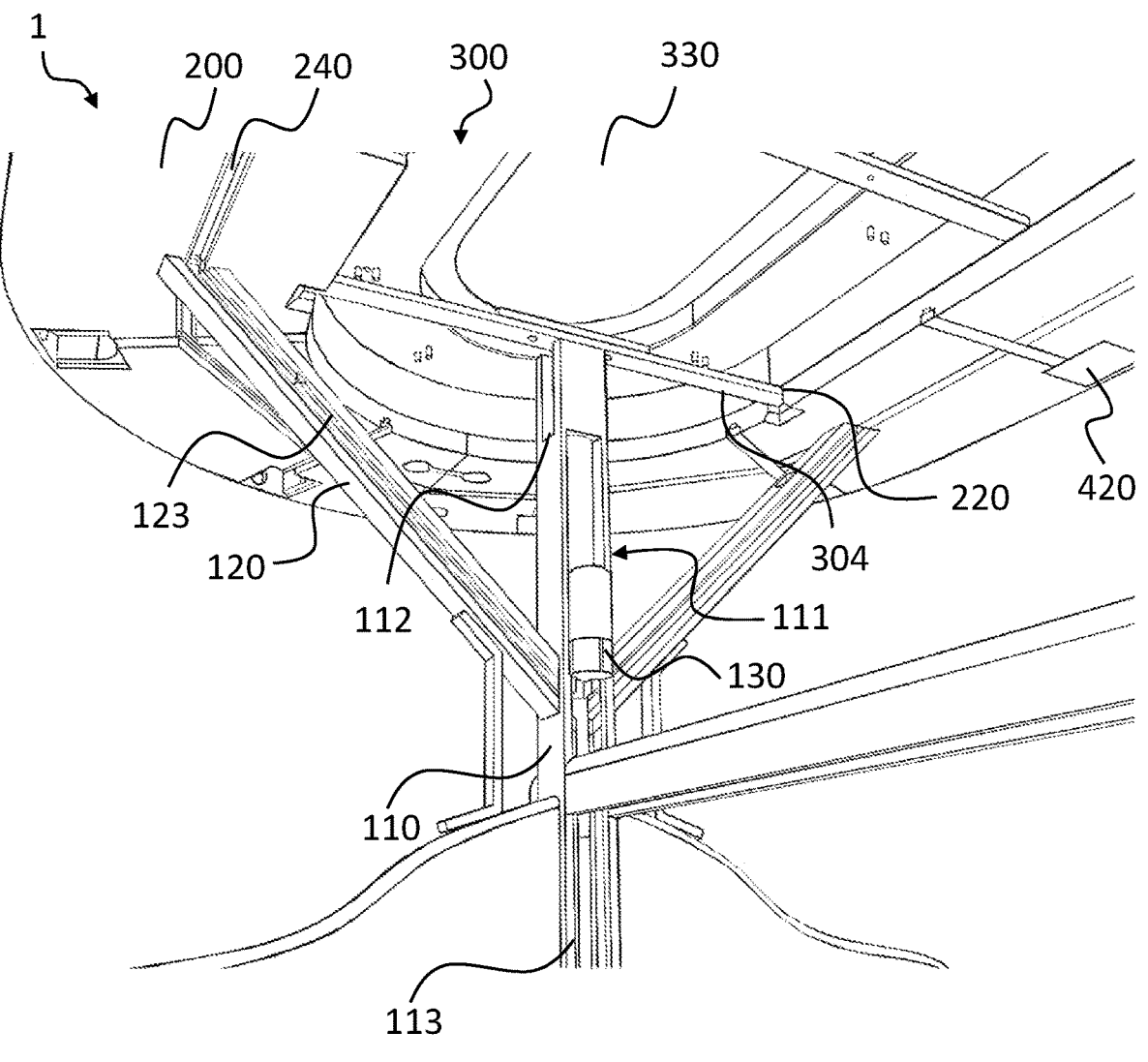
FIG. 5 a perspective view of the dining table according to FIG. 2 from below.

In FIG. 5, which is a perspective view from below of the dining table 1 according to FIG. 2, the mechanism of movement of the extendable section 300 in the vertical direction is shown in more detail.

The support frame 100 has at least two extendable columns 110 and at least two support columns 120 connected to each other. The upper end of the extendable columns 110 is configured to receive the extendable section 300, and the upper end of the support columns 120 is configured to receive the tabletop 200.

Each of the extendable columns 110 has a section 111 for receiving a movement member 130, which is optionally an electric lifting cylinder. The movement member 130 is used for moving the extendable section 300 in the vertical direction of the dining table 1.

Each of the extendable columns 110 has an end stop section 112 for receiving the crossbeam 304 of the extendable section 300 in the lowered position.

The tabletop has one or more end stop sections 220 for receiving the crossbeam 304 in the raised position. In addition, the tabletop 200 (on the lower side), the extendable columns 110 and the support columns 120 have a plurality of recesses 113, 123 and 240, respectively, as cable guides for power supply or regulation. The tabletop 200 may have a plurality of recesses for installation of the regulators 420 at the respective seat.

Figure 6:
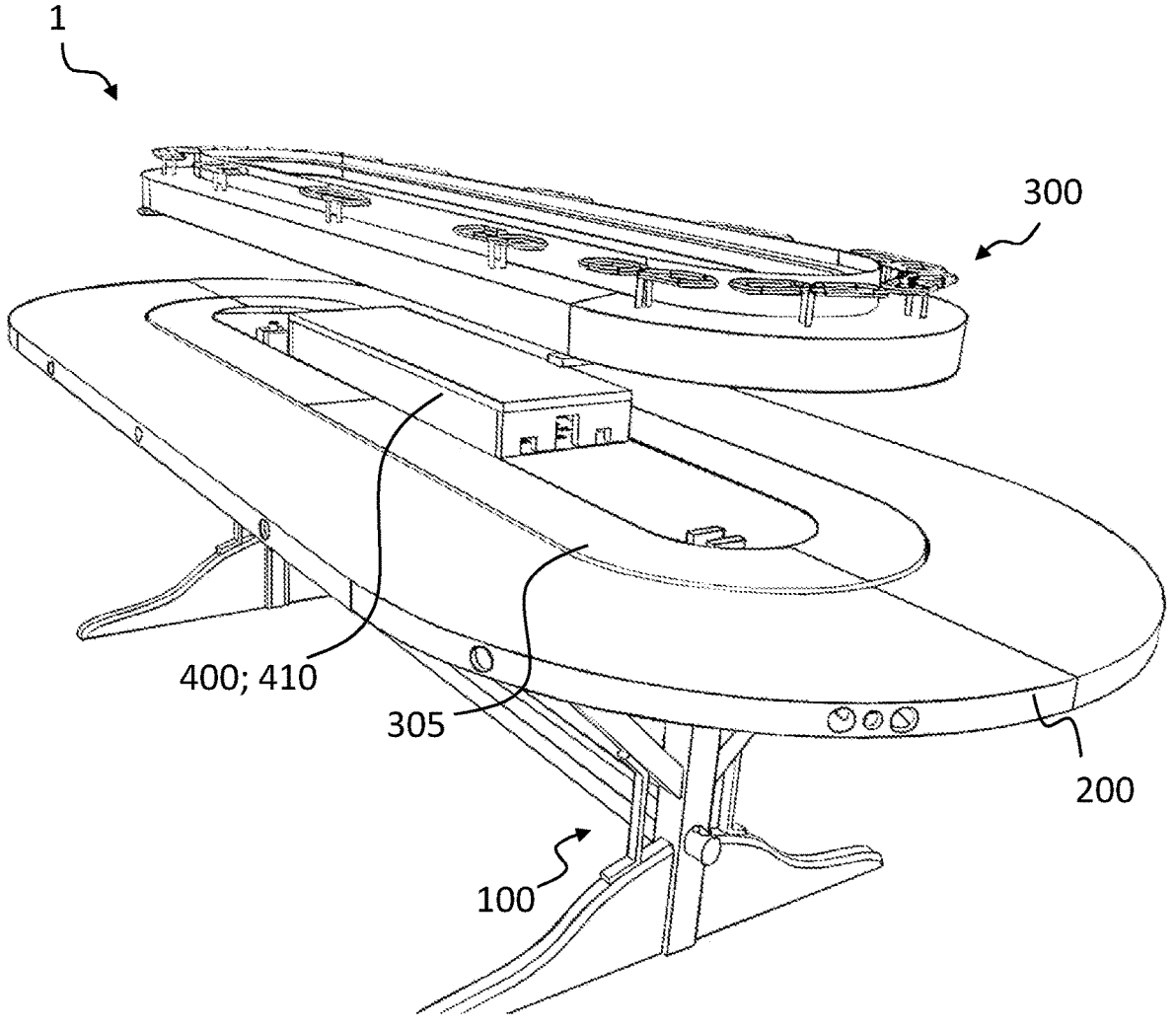
FIG. 6 an exploded view of the dining table according to FIG. 1.

FIG. 6 is an exploded view of the dining table 1 according to FIG. 1. It shows a control device 400 for the regulation of the heating elements 311 and/or for the control of the movement of the extendable section 300 arranged in a fire protection housing 410. The control device 400 is arranged below the depositing surface 330 in the extendable section 300 and on one or more crossbeams 304 of the extendable section 300. The extendable section 300 is covered from below by a cover 305.

In operation, the heating elements 311 are powered by one or more cables from a power source, optionally with a voltage in a range of from 100 to 240 volts or at least 400 volts, and controlled by one or more cables from the regulator 420 and/or the control device 400. Optionally, the regulators 420 are each connected to the control device 400.

For safety reasons, the control device 400 is optionally configured such as to allow turning on and/or off of the one or more heating elements 311 in the raised position only. Also, optionally, movement of the extendable section 300 from the raised position to the lowered position is prevented when the one or more heating elements 311 are turned on and/or before the one or more heating elements 311 has/have been turned off for a predetermined minimum cooling time. An exception may me made when the heating elements 311 have only been on for a short period of time prior to being turned off, optionally for less than 30 seconds. Alternatively, or additionally, the dining table 1 may comprise one or more temperature sensors (not shown), with the control device 400 of the dining table 1 being configured to prevent movement of the extendable section 300 from the raised position to the lowered position before the one or more temperature sensors determine that the temperature of the hot plate 320, the pocket-shaped opening 310 and/or the one or more heating elements 311 is below a predetermined maximum temperature.

The one or more heating elements 311 may be automatically turned off by a control device 400 after turning on and a predetermined eating time, optionally of more than 4 hours.

More particularly, embodiments of the invention relate to the following aspects:

1. A dining table (1), comprising:
   a support frame (100);
   a tabletop (200) mounted on the support frame (100), the tabletop (200) having a recess (210); and
   an extendable section (300), the extendable section (300) being received in the recess (210) of the tabletop (200) and comprising a pocket-shaped opening (310) with one or more heating elements (311) for heating a food portion;
   wherein the extendable section (300) is movable in the vertical direction of the dining table (1) between a lowered position in which the pocket-shaped opening (310) is sunk in the recess (210) and a raised position in which the pocket-shaped opening (310) protrudes from the tabletop.

2. Dining table (1) according to the preceding aspect, wherein the pocket-shaped opening (310) comprises a base (312) for depositing at least one container with the food portion, optionally for depositing a plurality of containers with a food portion each.

3. Dining table (1) according to the preceding aspect, wherein the base (312) of the pocket-shaped opening (310) in the raised position is arranged at the same level as or above the tabletop (200), optionally at least 0.5 cm or at least 1 cm above the tabletop (200).

4. Dining table (1) according to any one of the preceding aspects, wherein the extendable section (300) in the lowered position protrudes less than 5 cm beyond the tabletop (200) or less than 2 cm, optionally wherein it does not protrude above the tabletop (200).

5. Dining table (1) according to any one of the preceding aspects, wherein the pocket-shaped opening (310) comprises an inner side wall (313) and/or a ceiling (314).

6. Dining table (1) according to any one of the preceding aspects, wherein the pocket-shaped opening (310) is open to the side and/or towards the tabletop (200).

7. Dining table (1) according to any one of the preceding aspects, wherein the pocket-shaped opening (310) is formed circumferentially around the extendable section (300).

8. Dining table (1) according to any one of the preceding aspects, wherein the extendable section (300) further comprises a lower side wall (301) extending downwardly from the pocket-shaped opening (310).

9. Dining table (1) according to any one of the preceding aspects, wherein the pocket-shaped opening (310) and/or the extendable section (300) is made of metal, optionally of steel, for example of stainless steel.

10. Dining table (1) according to any one of the preceding aspects, wherein the one or more heating elements (311) are heating loops.

11. Dining table (1) according to any one of the preceding aspects, wherein the one heating element extends along the pocket-shaped opening (310) around the extendable section (300) or wherein the plurality of heating elements (311) are arranged along the pocket-shaped opening (310) around the extendable section (300).

12. Dining table (1) according to any one of the preceding aspects, further comprising a regulator (420) and/or a control device (400) for adjusting the heat output and/or the temperature of the one or more heating elements (311).

13. Dining table (1) according to any one of the preceding aspects, wherein the heat output and/or temperature of the plurality of heating elements (311) is adjustable individually or in subgroups, optionally by a respective user.

14. Dining table (1) according to the preceding aspect, wherein the dining table (1) comprises a plurality of regulators (420) each allowing a user to adjust the temperature and/or the heat output for a single heating element (311) or for a subset of the heating elements (311).

15. Dining table (1) according to any one of the preceding aspects, wherein the heating elements (311) are arranged along a straight section of the pocket-shaped opening (310) at a minimum distance from each other of 20 cm or of 40 cm.

16. Dining table (1) according to the preceding aspect, wherein the heating elements (311) are arranged more closely along a curved section or a corner section of the pocket-shaped opening (310) than along the straight section.

17. Dining table (1) according to any one of the preceding aspects, wherein the dining table (1) comprises at least eight, at least ten, or at least twelve heating elements (311).

18. Dining table (1) according to any one of aspects 2 to 17, wherein the one or more heating elements (311) are disposed at a distance from the base (312), the distance optionally being at least 3 cm or at least 5 cm.

19. Dining table (1) according to any one of aspects 2 to 18, wherein the one or more heating elements (311) are configured to heat the food portion from above.

20. Dining table (1) according to any one of aspects 2 to 19, wherein the one or more heating elements (311) are configured such that the one or more containers deposited on the base (312) can be arranged below the heating elements.

21. Dining table (1) according to any one of aspects 5 to 20, wherein the one or more heating elements (311) are arranged below and/or along the ceiling (314).

22. Dining table (1) according to any one of the preceding aspects, wherein the extendable section (300) comprises a depositing surface (330).

23. Dining table (1) according to the preceding aspect, wherein the depositing surface (330) is arranged above the base (312); and/or wherein the depositing surface (330) is arranged adjacent to a top surface of the ceiling (314) and/or substantially at the same level as the top surface of the ceiling (314).

24. Dining table (1) according to any one of the two preceding aspects, wherein the depositing surface (330) rests on and/or is removable from the extendable section (300).

25. Dining table (1) according to any one of the preceding three aspects, wherein the extendable section (300) comprises a central recess (302) and/or a supporting surface (303) for receiving the depositing surface (330).

26. Dining table (1) according to any one of the four preceding aspects, wherein the depositing surface (330) is made of a material having a lower thermal conductivity than the pocket-shaped opening (310); and/or wherein the depositing surface (330) is made of marble and/or stone.

27. Dining table (1) according to any one of the preceding five aspects, wherein the depositing surface (330) is formed integrally or from a plurality of segments.

28. Dining table (1) according to any one of the six preceding aspects, wherein the pocket-shaped opening (310) surrounds the depositing surface (330) at least partially or completely.

29. Dining table (1) according to any one of the preceding aspects, wherein the extendable section (300) further comprises a hot plate (320).

30. Dining table (1) according to the preceding aspect, wherein the hot plate (320) is disposed above the base (312) of the pocket-shaped opening (310) and/or wherein the hot plate (320) forms the ceiling (314) of the pocket-shaped opening (310).

31. Dining table (1) according to any one of the two preceding aspects, wherein the hot plate (320) rests on and/or is removable from the extendable section (300).

32. Dining table (1) according to any one of the preceding three aspects, wherein the extendable section (300) comprises a central recess (302) and/or a supporting surface (303) for receiving the hot plate (320).

33. Dining table (1) according to any one of the four preceding aspects, wherein the inner side wall (313) of the pocket-shaped opening (310) is configured to receive the hot plate (320), the inner side wall (313) optionally surrounding the hot plate (320) at least partially or completely.

34. Dining table (1) according to any one of the five preceding aspects, wherein the hot plate (320) is made of a material having a higher thermal conductivity than the supporting surface (330) and/or of steel.

35. Dining table (1) according to any one of the six preceding aspects, wherein the heating plate (320) is formed integrally or from a plurality of segments.

36. Dining table (1) according to any one of the seven preceding aspects, wherein the heating surface (320) forms a heating surface for depositing at least one container with a food portion, optionally for depositing a plurality of containers with a food portion each, wherein the heating surface is arranged substantially flush with or below the depositing surface (330).

37. Dining table (1) according to the preceding aspect, wherein the heating surface is arranged at least 0.3 cm, at least 0.5 cm or at least 1 cm below the depositing surface (330).

38. Dining table (1) according to any one of the preceding aspects, wherein the heating surface is surrounded by a radially inner raised edge and/or a radially outer raised edge, optionally the inner and/or the outer raised edge being formed by the hot plate (320).

39. Dining table (1) according to any one of the preceding ten aspects, further comprising a cover (321) for the hot plate (320), wherein a top surface of the cover (321) is optionally substantially flush with the depositing surface (330).

40. Dining table (1) according to any one of the preceding aspects, wherein, in operation, the heating elements (311) are powered by one or more cables from a power source, optionally with a voltage in a range of from 100 to 240 volts or at least 400 V, and/or wherein the heating elements (311), in operation, are controlled via one or more cables from a regulator (420) and/or a control device (400).

41. Dining table (1) according to any one of the preceding aspects, wherein a control device (400) of the dining table (1) is configured such that the one or more heating elements (311) cannot be turned on in the lowered position; and/or that the one or more heating elements (311) can be turned on and off in the raised position only.

42. Dining table (1) according to any one of the preceding aspects, wherein a control device (400) of the dining table (1) is configured to prevent movement of the extendable section (300) from the raised position to the lowered position when the one or more heating elements (311) are turned on.

43. Dining table (1) according to any one of the preceding aspects, wherein a control device (400) of the dining table (1) is configured to prevent movement of the extendable section (300) from the raised position to the lowered position before the one or more heating elements (311) have been turned off for a predetermined minimum cooling time, the minimum cooling time optionally depending on the duration of a previous operation of the heating elements (311).

44. Dining table (1) according to the preceding aspect, wherein the control device (400) does not prevent movement from the raised position to the lowered position when the heating elements (311) have been on for only a short time before being turned off, optionally for less than 30 seconds.

45. Dining table (1) according to any one of the preceding aspects, the dining table (1) comprising one or more temperature sensors, wherein a control device (400) of the dining table (1) is configured to prevent movement of the extendable section (300) from the raised position to the lowered position before the one or more temperature sensors determine that the temperature of the hot plate (320), the pocket-shaped opening (310) and/or the one or more heating elements (311) is below a predetermined maximum temperature.

46. Dining table (1) according to any one of the preceding aspects, wherein the one or more heating elements (311) in the raised position are automatically turned off by a control device (400) after turning on and a predetermined eating time, optionally of more than 4 hours.

47. Dining table (1) according to any one of the preceding aspects, wherein heating elements (311) are intermittently turned on and off along a curved section or a corner section of the pocket-shaped opening (310), optionally wherein said heating elements (311) are repeatedly automatically turned off after exceeding a predetermined on time for a predetermined pause time and then turned on again.

48. Dining table (1) according to the preceding aspect, wherein the on time is at least 1 minute, optionally at least 2 minutes.

49. Dining table (1) according to either of the preceding aspects, wherein the pause time is at least 10 seconds, optionally at least 20 seconds.

50. Dining table (1) according to any one of the preceding aspects, wherein the dining table (1) comprises a control device (400) for controlling the heating elements (311) and/or for controlling one or more movement members (130).

51. Dining table (1) according to the preceding aspect, wherein the control device (400) is arranged in a fire protection housing (410), the housing (410) being optionally formed of gypsum fiber.

52. Dining table (1) according to one of the two preceding aspects, wherein the control device (400) is arranged below the depositing surface (330) in the extendable section (300), optionally on one or more crossbeams (304) of the extendable section (300).

53. Dining table (1) according to any one of the preceding aspects, wherein the extendable section (300) is covered from below with a cover (305) which is optionally made of aluminum.

54. Dining table (1) according to any one of the preceding aspects, wherein the support frame (100) comprises at least two extendable columns (110), the upper end of the columns (110) being configured to receive the extendable section (300).

55. Dining table (1) according to the preceding aspect, wherein the support frame (100) further comprises at least two support columns (120), the upper end of the support columns (120) being configured to receive the tabletop (200).

56. Dining table (1) according to the preceding aspect, wherein the support columns (120) are connected to the extendable columns (110).

57. Dining table (1) according to any one of the preceding three aspects, wherein each of the extendable columns (110) comprises a movement member (130), optionally an electric lifting cylinder.

58. Dining table (1) according to the preceding aspect, wherein each of the extendable columns (110) comprises a section (111) for receiving the movement member (130).

59. Dining table (1) according to any one of the five preceding aspects, wherein the extendable columns (110) comprise an end stop section (112) for receiving the extendable section (300) in the lowered position, which is optionally a crossbeam (304) of the extendable section (300).

60. Dining table (1) according to any one of the six preceding aspects, wherein the extendable columns (110) and/or the support columns (120) comprise one or more recesses (113; 123) for the cable guides.

61. Dining table (1) according to any one of the preceding aspects, wherein the tabletop (200) has one of the following shapes: oval, circular, rectangular, hexagonal, octagonal.

62. Dining table (1) according to any one of the preceding aspects, wherein the extendable section (300), the pocket-shaped opening (310), the depositing surface (330) and the hot plate (320) have one of the following shapes: oval, circular, rectangular, hexagonal, octagonal.

63. Dining table (1) according to any one of the preceding aspects, wherein the tabletop (200) comprises an end stop section (220) for receiving the extendable section (300) in the raised position, which is optionally a crossbeam (304) of the extendable section (300).

64. Dining table (1) according to the preceding aspect, wherein the extendable section (300) in the raised position abuts the end stop section (220) of the tabletop (200) from below.

65. Dining table (1) according to any one of the preceding aspects, wherein the tabletop (200) comprises one or more recesses (240) for the cable guides, optionally on the lower side of the tabletop (200).

66. Dining table (1) according to any one of the preceding aspects, wherein the dining table (1) further comprises an extractor fan and/or a bench seat.

The invention claimed is:

1. A dining table, comprising:
a support frame;
a tabletop mounted on the support frame, the tabletop having a recess; and
an extendable section, the extendable section being received in the recess of the tabletop and comprising a pocket-shaped opening with one or more heating elements for heating a food portion; and
a control device,
wherein the extendable section is movable in the vertical direction of the dining table between a lowered position in which the pocket-shaped opening is sunk in the recess and a raised position in which the pocket-shaped opening protrudes from the tabletop, and
wherein the control device is configured such that at least one of the following is true:
the one or more heating elements cannot be turned on in the lowered position,
the one or more heating elements can only be turned on in the raised position, movement of the extendable section from the raised position to the lowered position is prevented when any of the one or more heating elements are turned on, or movement of the extendable section from the raised position to the lowered position is prevented before the one or more heating elements have been turned off for a predetermined minimum cooling time.

2. The dining table according to claim 1, wherein the pocket-shaped opening comprises a base for depositing a plurality of containers with a food portion each.

3. The dining table according to claim 2, wherein the one or more heating elements are disposed at a distance from the base wherein the distance is at least 3 cm.

4. The dining table according to claim 1, wherein the pocket-shaped opening comprises an inner side wall and a ceiling.

5. The dining table according to claim 1, wherein the pocket-shaped opening is open to the side or towards the surrounding tabletop.

6. The dining table according to claim 1, wherein the pocket-shaped opening is formed circumferentially around the extendable section.

7. The dining table according to claim 1, wherein the one or more heating element are each disposed along the pocket-shaped opening around the extendable section.

8. The dining table according to claim 1, wherein the control device is configured to adjust at least one of the heat output and the temperature of a plurality of the one or more heating elements, wherein the at least one of the heat output and the temperature of the plurality of one or more heating elements is adjustable individually or in subgroups, wherein the dining table further comprises a plurality of regulators each allowing a user to adjust the temperature and/or the heat output for a single heating element or for a subset of the heating elements.

9. The dining table according to claim 1, wherein a plurality of the one or more heating elements are arranged along a straight section of the pocket-shaped opening at a minimum distance from each other of 20 cm.

10. The dining table according to claim 1, wherein the extendable section further comprises a hot plate, and wherein the hot plate forms a ceiling of the pocket-shaped opening.

11. The dining table according to claim 10, wherein the hot plate rests on and is removable from the extendable section.

12. The dining table according to claim 1, wherein movement of the extendable section from the raised position to the lowered position is prevented by the control device before the one or more heating elements have been turned off for a predetermined minimum cooling time, wherein the minimum cooling time depends on a duration of a previous operation of the one or more heating elements.

13. The dining table according to claim 1, wherein the one or more heating elements in the raised position are automatically turned off by the control device after having been turned on for a predetermined eating time.

14. The dining table according to claim 1, wherein one or more of the one or more heating elements along a curved section or a corner section of the pocket-shaped opening are configured to be intermittently turned on and off.

15. The dining table according to claim 14, wherein the time on is at least 1 minute and wherein the time off is at least 10 seconds.

16. The dining table according to claim 1, wherein the support frame comprises at least two extendable columns, wherein an upper end of the columns is configured to receive the extendable section and comprises at least two support columns, wherein an upper end of the support columns is configured to receive the tabletop, and wherein each of the extendable columns comprises a movement member, wherein the movement member is an electric lifting cylinder.

17. The dining table according claim 16, wherein the extendable columns comprise at least one of an end stop section for receiving the extendable section in the lowered position and an end stop section for receiving the extendable section in the raised position.

18. A dining table, comprising:
a support frame;
a tabletop mounted on the support frame, the tabletop having a recess; and
an extendable section, the extendable section being received in the recess of the tabletop and comprising a pocket-shaped opening with one or more heating elements for heating a food portion; and
a control device,
wherein the extendable section is movable in the vertical direction of the dining table between a lowered position in which the pocket-shaped opening is sunk in the recess and a raised position in which the pocket-shaped opening protrudes from the tabletop, and
wherein the control device prevents movement of the extendable section from the raised position to the lowered position when any of the one or more heating elements are turned on.

19. The dining table of claim 18, wherein the dining table comprises a plurality of the heating elements and a plurality of regulators each allowing a user to adjust the temperature and/or the heat output for a single one of the heating elements or for a subset of the heating elements.

20. A dining table, comprising:
a support frame;
a tabletop mounted on the support frame, the tabletop having a recess; and
an extendable section, the extendable section being received in the recess of the tabletop and comprising a pocket-shaped opening with one or more heating elements for heating a food portion,
wherein the extendable section is movable in the vertical direction of the dining table between a lowered position in which the pocket-shaped opening is sunk in the recess and a raised position in which the pocket-shaped opening protrudes from the tabletop, and
wherein the support frame comprises at least two extendable columns, wherein an upper end of the columns is configured to receive the extendable section and comprises at least two support columns, wherein an upper end of the support columns is configured to receive the tabletop, and wherein each of the extendable columns comprises a movement member, wherein the movement member is an electric lifting cylinder.

* * * * *